J. G. HODGES.
CULTIVATOR.
APPLICATION FILED OCT. 28, 1916.
1,216,810.
Patented Feb. 20, 1917.
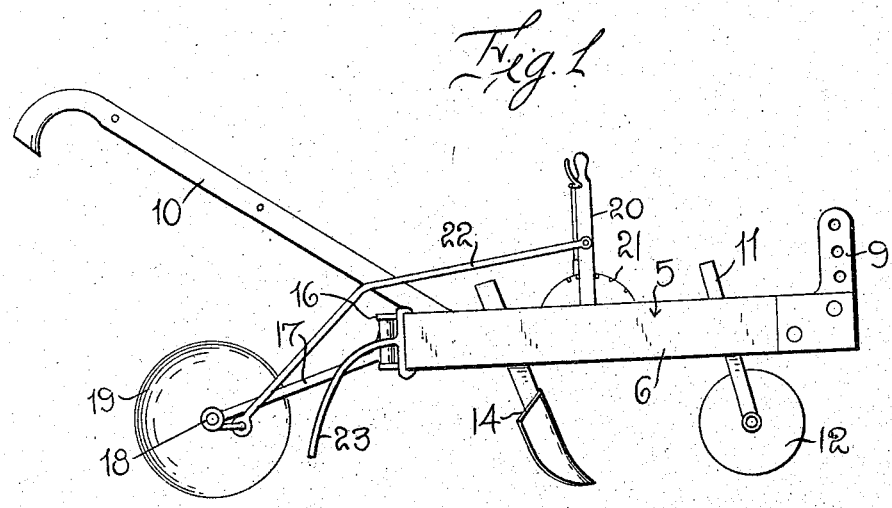
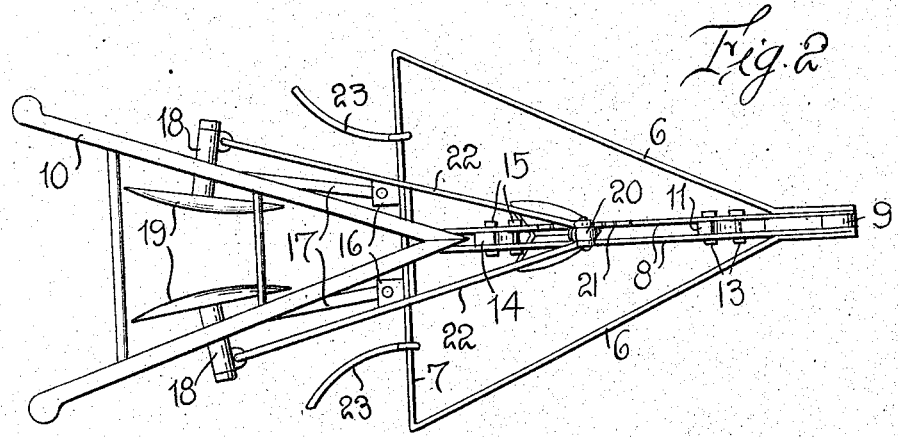
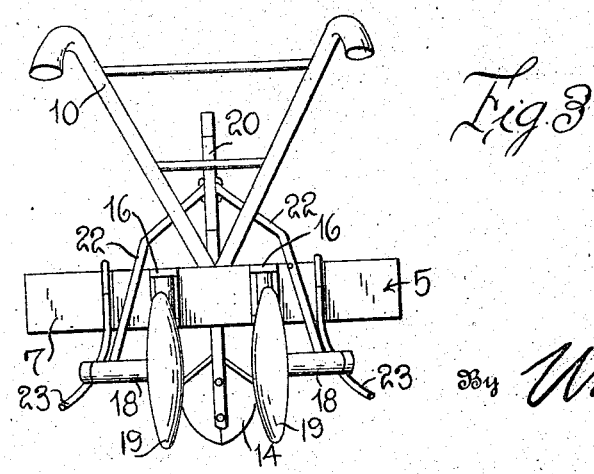
Inventor
J. G. HODGES
By Watson E. Coleman
Attorney

UNITED STATES PATENT OFFICE.

JESSE G. HODGES, OF OSCEOLA, MISSOURI.

CULTIVATOR.

1,216,810.

Specification of Letters Patent.

Patented Feb. 20, 1917.

Application filed October 28, 1916. Serial No. 128,269.

*To all whom it may concern:*

Be it known that I, JESSE G. HODGES, a citizen of the United States, residing at Osceola, in the county of St. Clair and State of Missouri, have invented certain new and useful Improvements in Cultivators, of which the following is a specification, reference being had to the accompanying drawings.

This invention relates to an improved cultivator and more particularly to a one-row cultivator, the invention having for its primary object to provide a very simply constructed machine for clearing the ground contiguous to the plant row of weeds and vines and also breaking up the soil.

It is a more particular object of the invention to provide a machine for the above purpose including a cutting disk, a plow shovel arranged rearwardly of the disk, cultivator disks arranged rearwardly of the shovel to operate in the furrow, and means to prevent the clogging of the disks by weeds or vines.

It is a further general object of the invention to provide a machine for the above purpose which is simple in its construction, strong and durable, and highly serviceable and convenient for the purpose in view.

With the above and other objects in view, my invention consists in the novel features of construction, combination and arrangement of parts to be hereinafter more fully described, claimed and illustrated in the accompanying drawing, in which, Figure 1 is a side elevation of a cultivator constructed in accordance with the preferred embodiment of my invention;

Fig. 2 is a top plan view; and

Fig. 3 is a rear end elevation.

Referring in detail to the drawing, 5 designates the main frame bar having forwardly converging side portions 6 and a rear, transverse, connecting portion 7. Central, longitudinally extending spaced bars 8 are fixed at their rear ends to the rear portion 7 of the bar 5 and at their forward ends are rigidly secured between the extremities of said bar. A suitable clevis 9 is secured between the forward ends of the bars 8, and the rearwardly extending, diverging handle bars 10 are fixed between the rear ends of these frame bars.

A standard 11 is provided upon its lower end with a rotatable cutting disk 12. This standard extends upwardly between the bars 8 and is tightly clamped in an adjusted position by the bolts 13 extending through said bars. In a similar manner, the standard of a plow or shovel 14 is secured between the bars 8, adjacent their rear ends, by means of the clamping bolts 15.

To the transverse, intermediate portion 7 of the frame bar 5, spaced bearing brackets 16 are suitably secured, and in each of these brackets a rearwardly extending rod 17 is pivotally mounted for horizontal swinging movement. A suitable bearing 18 is secured to the rear end of each of the rods 17, in which the axle or arbor of a cultivator disk 19 is journaled. A lever 20 is fulcrumed at its lower end upon one of the longitudinal frame bars 8 and carries the usual spring-pressed dog for engagement with the teeth of a rack 21 fixed to said frame bar. Rearwardly diverging rods 22 are loosely connected at their upper ends to said lever and have their rear lower ends loosely attached to the bearings 18. It will thus be apparent that by the manipulation of the lever 20, the cultivating disks 19 may be moved toward or from each other and suitably spaced apart.

To the transverse portion 7 of the frame bar 5, and outwardly of the respective cultivator disks, a rearwardly and laterally curved rod 23 is fixed. These rods are provided for the purpose of deflecting weeds and vines and preventing the same from being caught by the cultivator disks and interfering with the action of the latter.

In the operation of the machine, it will be understood that the same is operated contiguous to the plant row, and as it is drawn, the cutting disk 12 will cut or sever vines growing on the surface of the ground in advance of the shovel 14. This shovel plows a furrow in the ground, the depth of which can be properly regulated by the vertical adjustment of the shovel standard between the frame bars 8, and throws the earth in opposite directions. The disks following the rear of the shovel, operate in the furrow and cut up the earth clods, directing the earth outwardly toward the sides of the machine. These disks thoroughly stir up or agitate the soil and weeds and other plant roots so that the latter will serve as a fertilizer for the soil.

From the above, it will be seen that I have produced a very simply constructed, as well as efficient and serviceable cultivator for the purpose in view, whereby the soil may be thoroughly cultivated and weeds and vines destroyed, thereby materially promoting the growth of the plants. The several parts of the machine being of very simple construction, it is apparent that the same will not readily get out of order and are very strong and durable. The machine may also be manufactured at comparatively small cost.

While I have shown and described the preferred construction and arrangement of the several parts, it is to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

In a cultivator, a frame, a cutting disk mounted in the forward end of the frame, a shovel mounted in the frame rearwardly of the cutting disk, means for vertically adjusting the shovel, spaced cultivating disks mounted upon the rear end of the frame, manually operable means for adjustably spacing the disks, and rearwardly and laterally curved fender rods fixed to the frame at the outer sides of the respective disks.

In testimony whereof I hereunto affix my signature in the presence of two witnesses.

JESSE G. HODGES.

Witnesses:
 WALDO P. JOHNSON,
 F. C. STARK.

Copies of this patent may be obtained for five cents each, by addressing the "Commissioner of Patents, Washington, D. C."